June 3, 1930. H. F. SMITH 1,761,849
CONTROL MECHANISM
Filed Sept. 2, 1924 3 Sheets-Sheet 1
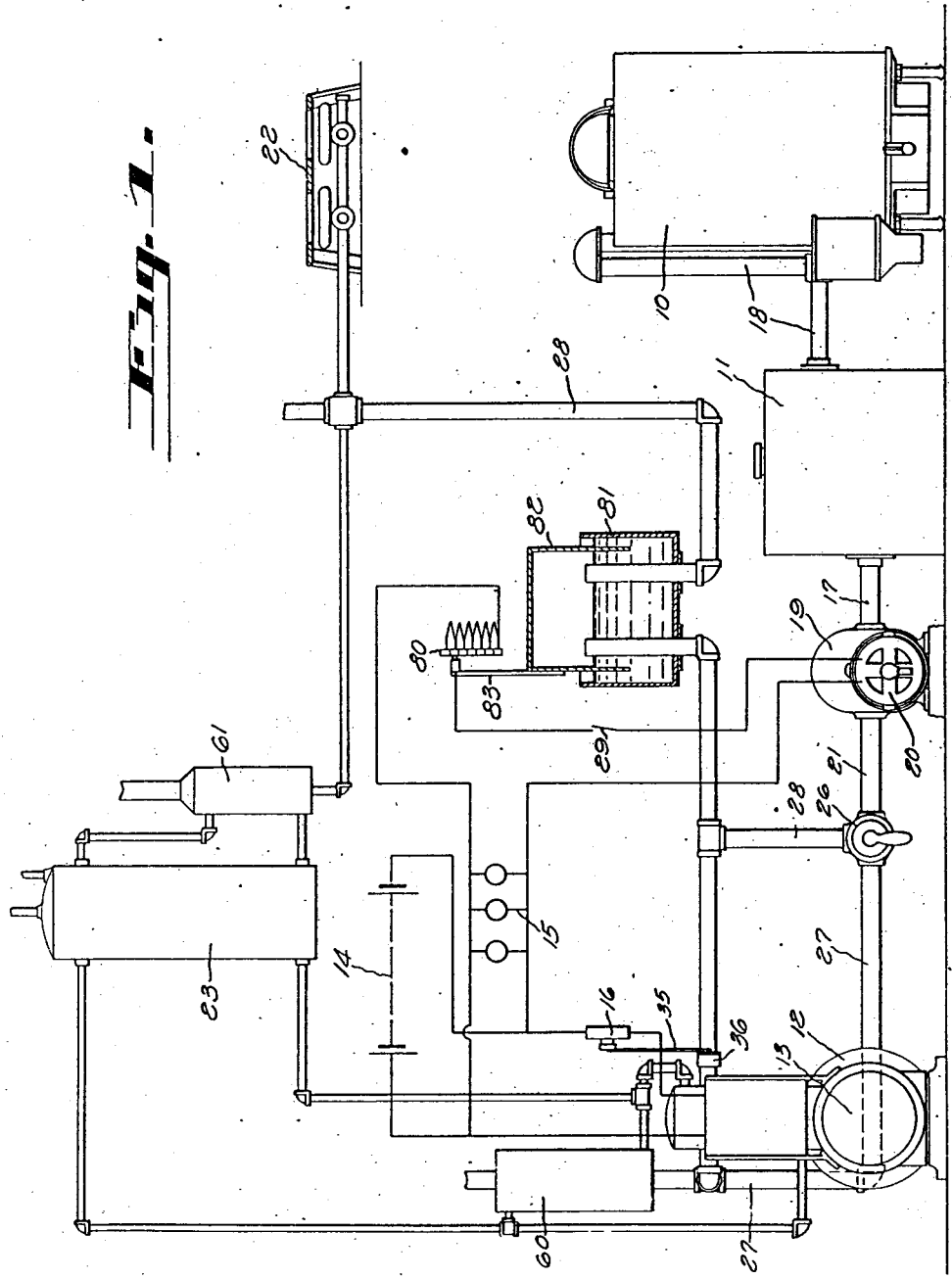

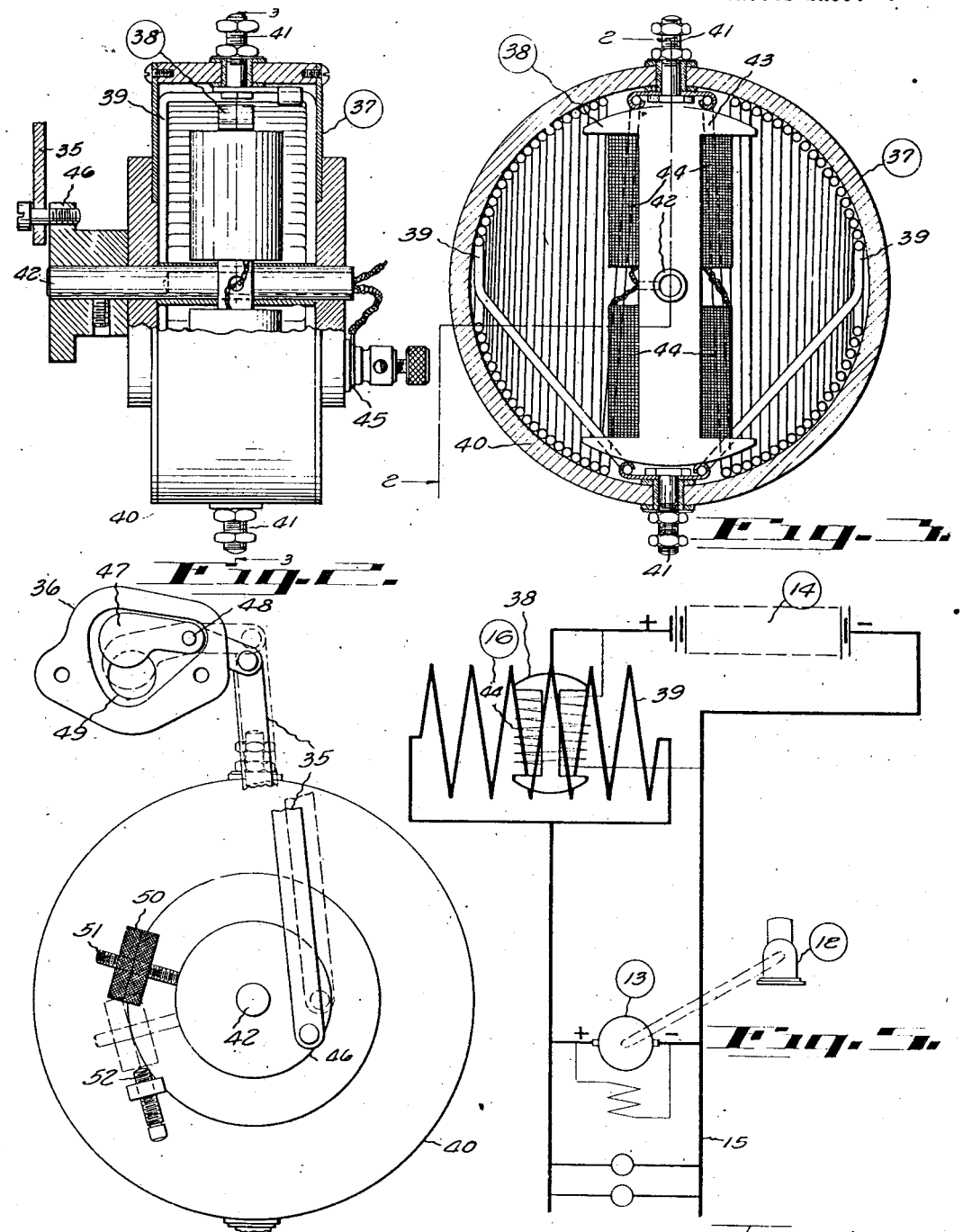

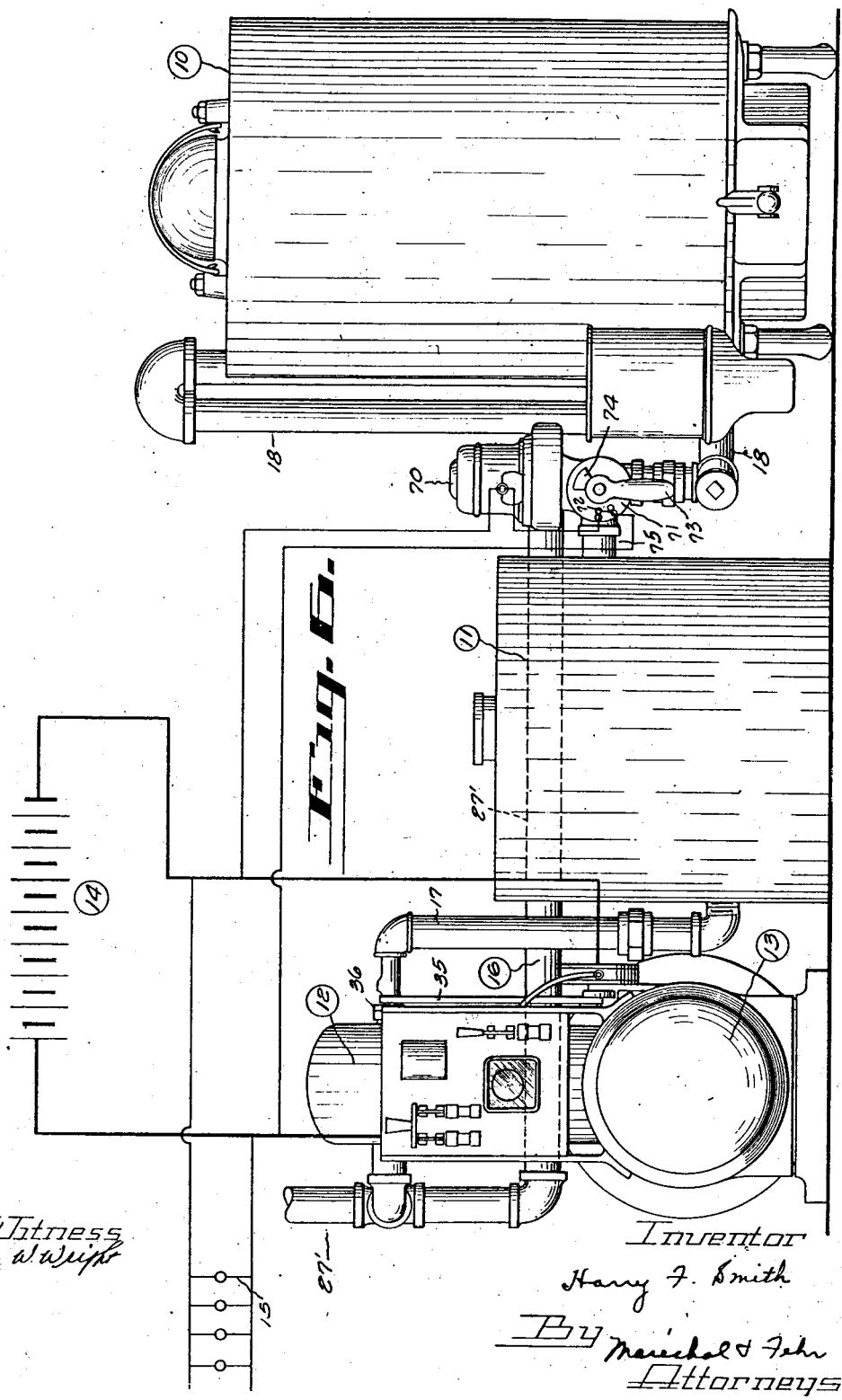

Patented June 3, 1930

1,761,849

UNITED STATES PATENT OFFICE

HARRY F. SMITH, OF DAYTON, OHIO, ASSIGNOR TO THE GAS RESEARCH COMPANY, OF DAYTON, OHIO, A CORPORATION OF OHIO

CONTROL MECHANISM

Application filed September 2, 1924. Serial No. 735,523.

This invention relates to a gas-power system, and more particularly to such a system intended for domestic use.

One of the principal objects of the invention is to provide a gas-power generating system, comprising a producer for generating a combustible gas, an engine-generator for operating upon the generated gas to supply electricity to a distribution circuit and to charge a storage battery, a heating device for operating upon the generated gas, and means for controlling the operation of the engine to cause the generator driven thereby to substantially carry the distribution load.

Another object of the invention is to provide a power generating system comprising a gas producer, a gas engine connected thereto, an electric generator driven by the engine, a storage battery, and control mechanism for controlling the output of the engine to cause the generator to substantially carry the distribution load.

Another object of the invention is to provide a power plant comprising an engine, electric generator and electric battery, with control mechanism arranged to permit running the engine continuously on the battery line without damaging the battery.

Still another object of the invention is to provide a power generating system comprising a storage battery, an engine-generator large enough in capacity to carry a load in excess of the battery capacity, and means for controlling the rate of charge to the battery concomitantly with variable external load.

Another object of the invention is to provide a gas generating system comprising means for automatically varying the volume of gas taken from the gas plant so as to keep this volume as small as possible and at the same time maintaining the gas quality at sufficiently high grade to be combustible.

Other objects and advantages of the invention will be apparent from the following description when taken in connection with the accompanying drawing, in which Fig. 1 is an elevational and somewhat diagrammatical view of a gas-power plant embodying the invention.

Fig. 2 is a side elevation of the controller, partly in section on the line 2—2 of Fig. 3;

Fig. 3 is a vertical section on the line 3—3 of Fig. 2;

Fig. 4 is a view showing the linkage between the controller and the engine throttle valve;

Fig. 5 is a diagrammatic view of the control mechanism of the invention; and

Fig. 6 is an elevational view of a gas-power plant similar to that shown in Fig. 1, but constructed so that the engine-generator utilizes the entire gas output of the producer.

In the supplying of gas for domestic and analogous purposes, it is quite desirable that the gas generating system be so arranged that gas shall be at all times available to the user. This my be accomplished by providing for gas storage; but the use of such storage is costly, dangerous and inconvenient. To eliminate this gas storage, the plant should be such that it will supply gas when needed, in the quantities needed. And such a plant should preferably be one adapted for running continuously for considerable periods, and for flexibility in operation.

This invention comprises the providing of a gas and power supplying system which is adapted to economically supply gas for heating, cooking, etc., and electricity for lighting and power purposes. And it comprises as elements of the apparatus for accomplishing these things, a gas producer to which is connected a gas engine-electric generator for generating electrical energy, and a pump for blasting of the producer for generating gas as needed.

As shown, no gas storage is provided and consequently the producer is intended to operate continuously so that the fuel bed will be at all times in good gas making condition and thus capable at all times of generating gas to meet the demand.

As shown in Fig. 1 the producer has connected thereto a pump for blasting the fuel bed of the producer during operation to generate the amount of gas needed for operating the engine and for supplying such gas as may be needed for heating purposes. The electric-generator is not only connected to the distribution line, but it is also connected to a storage battery, which is preferably of relatively small capacity, the arrangement being such that the engine-generator operates to carry any electric load, within the capacity of the generator; the battery taking care of any temporary load in excess of the engine-generator capacity, and furnishing such energy as may be needed from time to time for blasting the producer during the starting period after a shut down, such as is necessary from time to time to permit of cleaning the producer, or the purifier, or for other analogous reasons. The electric system is provided with control mechanism for varying the output of the engine so that the generator will thus carry the electric load, under normal operating conditions.

With this arrangement, the engine may operate over long periods. The control means functions to limit the charge to the storage battery so that it is charged at a low rate. Consequently, although the engine-generator has capacity in excess of the storage battery, no damage to the battery will result even if the charging is continued over long periods of time.

As showing a preferred embodiment of the invention, the pump for supplying gas to the gas distribution pipe is operated by a suitable electric motor. But the pump may be driven in any other suitable way, as by means of a hot air engine operating upon part of the heat energy made available by the gas making reactions in the producer, or it may be operated in any other suitable way.

Referring particularly to Figs. 1 and 6, the apparatus comprises a gas producer 10, a purifier 11, an internal combustion engine 12 connected to the producer and arranged in driving connection with an electric generator 13, for charging a storage battery 14 and for supplying current to a distribution circuit 15. The engine 12 is provided with a controller 16 for controlling the output of the generator to meet the demands in the distribution circuit. The engine-generator thus carries the normal distribution load, the battery carrying part of the load only when the load exceeds the capacity of the engine-generator. Consequently, the battery may be of comparatively small capacity. And since it is not subjected to rapid discharge and charge its life is greatly prolonged.

The producer 10 may be of any desired type, but it is preferably of the type shown in the co-pending application of Harry F. Smith, Serial No. 570972 filed June 26, 1922, comprising an unlined metallic shell and so constructed that during gas making operation the active zone of the fuel bed is restricted so as to be completely surrounded by a zone of inactive carbonaceous material. Such a producer is very flexible in operation and will respond almost instantaneously from condition of minimum load to maximum load, or vice versa. The purifier may also be of any desired kind, such as applicant's well-known glass wool type; or one containing a layer of finely divided purifying material, such, for example, as carbonaceous material divided until the particles are of a fineness corresponding to the dimensions of the particles of impurities to be removed.

The engine is preferably connected through the delivery main to the gas outlet pipe 17 of the purifier, the inlet of the purifier being connected to the interior of the producer through the offtake pipe 18. Also connected in the pipe 17 is a pump 19, driven in any suitable manner, as by means of an electric motor 20 connected in the distribution circuit of the generator 13. The arrangement is also such that, with the electric generator not operating the pump may be operated from the storage battery for blasting the fuel bed of the producer during starting. This pump draws a blast through the producer to cause the generation of gas, which gas is forced by the pump through the gas delivery pipe 21 to suitable heating or work devices, such as the engine 12, the stove illustrated diagrammatically at 22, and the conventional, domestic, hot water heating tank shown diagrammatically at 23.

Located in the delivery pipe 21 is a three-way valve 26, preferably of the turn plug type. One outlet of the casing of the valve 26 is connected to the vent pipe 27, while the other outlet is connected to the gas delivery main 28. Located in the circuit of the motor 20 is a hand operated switch 29. The arrangement of the valve is such that moving the handle in one direction moves the valve to connect the interior of the producer to the vent pipe, while moving it in the opposite direction connects the interior of the producer to the gas delivery main 28.

In starting the producer the valve handle is moved to connect the producer to vent. The switch 29 is then actuated to close the pump motor circuit to blow up the fuel bed.

When the gas is of suitable quality the producer is disconnected from vent and the valve 26 actuated to cause the gas to be passed into the delivery main. The engine may now be started in the usual way.

As shown in Fig. 1 the engine 12 and dynamo electric machine 13 are constructed as a unit, the electric machine 13 being mounted directly on the engine crank shaft. The electric machine is operable as a generator to charge the battery and to furnish current to the distribution circuit, or as a motor taking current from the battery to crank the engine. The output of the engine is regulated by the controller 16 which is connected by means of link 35 with the throttle valve 36.

Referring particularly to Figs. 2 to 5 inclusive it will be seen that the controller comprises primarily a field frame or stator 37 and an armature or rotor 38 which is adapted to rotate in the magnetic field produced by the stator.

The stator or field member consists of two coils or windings 39 of heavy wire which are wound to conform to the interior shape of an iron or magnetic housing 40 completely enclosing the two coils. The windings 39 are connected with the terminals 41 and are so wound that they produce magnetic fields in the same sense, that is, magnetic fields which supplement one another, so that, as illustrated in Fig. 3, the combined magnetic field of the two windings 39 will extend horizontally within the housing 40. The return path for the magnetic field outside of the coils 39 is through the iron of the housing 40. The iron housing 40 forms a magnetic shield which protects the electrical parts from the influence of outside magnetic fields and of adjacent bodies of magnetic material, and hence the governor, being free from extraneous magnetic influence, is said to be astatic.

Journalled in the side walls of the housing 40 is a shaft 42 upon which is supported the armature or rotor 38. The latter consists generally of a laminated iron core 43 having wound about its stem portion two shunt coils or windings 44 of relatively fine wire. These coils are connected in series with one another, and the terminal portions thereof are passed through an aperture in the hollow shaft 42 to suitably insulated binding posts 45 mounted on the side of the housing 40. The two shunt coils 44 are wound in the same sense and produce magnetic poles on the opposite ends or heads of the armature. Mounted on the end of the shaft 42 is a block or lever 46 for operating the link 35.

Referring particularly to Fig. 5 it will be seen that the windings or coils 39, being in parallel with one another, are connected in series with the charging circuit from the dynamo electric machine 13 to the battery 14. These windings are therefore termed series windings. The winding 44 is connected across the poles of the battery 14 or of the dynamo electric machine 13, and this winding is therefore termed a shunt winding. Consequently the electromagnet part of the rotor, of which this shunt winding forms a part, is of constant or unchanging polarity.

The link 35 is connected at its upper end with the arm of the throttle plate 47 which is pivoted at 48. The throttle plate 47 is movable to open or close the engine intake 49 thereby admitting more or less gas to the engine so that it may carry more or less load. The proportion and weight of the parts is such that when the controller is not energized the throttle valve will be wide open as shown in Fig. 4.

When the throttle is fully open as illustrated in Fig. 4 the armature 38 is disposed at right angles to the magnetic field produced by the coils 39 as shown in Figs. 3 and 5. Upon operation of the engine the electric machine 13 begins to charge the battery 14 the current passing from the positive pole of the electric machine through series windings 39 of the controller to the positive pole of the battery, and thence from the negative pole of the battery back to the negative pole of the electric machine 13. The effect of such a charging current passing through the series windings 39 is to produce a magnetic field tending to turn the armature 38 in a counter-clockwise direction to close the throttle valve. The extent to which the throttle valve closes, for a given current flow through the controller, is determined by the effective weight of the moving parts, and to vary this there is provided an adjustable weight 50 which is movable upon the arm 51. An adjustable stop 52 is also provided to limit the extent to which the throttle valve 36 may be closed.

This construction of the governor or controller is such that by adjusting the positioning of the weight 50 any desired condition of charging current flowing from the generator to the battery may be established. That is, the rate of charge to the battery may be varied from substantially no charge on up to maximum charge. According to the present invention, however, it is desired to normally operate the engine 12 at a small fraction of its maximum load whereby to provide the minimum air suction to maintain the gas producer in continuous operation at minimum load or driving rate. By this is meant the lowest rate of blast which will maintain the fuel bed incandescent so that it will respond quickly to furnish any desired increased quantity of good combustible gas to meet increased demand. It has been found in practice that with a producer of the character described above, with an effective grate diameter of 4 inches, operating upon charcoal, the generation of enough gas to heat the water in the ordinary hot water tank will keep the fuel bed in good gas making condition; such condition that it will respond almost instantaneously from condition of minimum load to maximum load. As shown, however, in Fig. 1, the pump 19 operates continuously during operation of the producer. This requires operation of the engine. The exhaust gases from the engine pass through a waste heat boiler 60 which is connected to the hot water heater 23. Also the water jacket of the engine cylinder is connected to the hot water tank. And the waste heat from the engine is ordinarily sufficient to keep the water in the hot water system at the desired temperature. But a burner, and heating coil, designated generally by the numeral 61, may be used if desired. The controller is so adjusted that when the engine-generator is operating at minimum load the generator will charge the battery at a low rate, preferably at a rate not in excess of one or two amperes.

With the controller thus adjusted to charge the battery at a low rate the armature 38 takes an inclined position with respect to the magnetic field produced by the stator whereby the throttle opening is very much restricted. As already stated the engine is preferably operated at a small fraction of its maximum speed under minimum load conditions, as this insures longer life for the engine. Remembering that the armature is disposed obliquely to the magnetic field while the battery is being charged, it will be seen upon reference to Fig. 5 that should there be a demand for current in the distribution circuit 15 this current must temporarily reduce the current flowing from the generator 13 through the series coils 39 to the battery, thereby weakening the magnetic field and permitting the armature to turn in a clockwise direction whereby the throttle valve is opened to admit more gas to the engine. This results in an increase in the output of the generator, until the latter not only supplies the demand in the distribution circuit but brings the current then flowing to the battery to substantially its original predetermined value.

The rotor 38 is preferably so wound that during operation the core is in a substantially saturated condition and is therefore substantially independent of voltage variations in the rotor winding 44, within the operating range.

As stated above, this control is preferably so arranged that the rate of charge to the battery is low. The battery does not normally carry any part of the load, the engine-generator carrying the entire distribution load so long as that load is within its capacity. Consequently, the E. M. F. of the battery remains substantially constant so long as the rate of charge or discharge is small when compared with the ultimate capacity of the battery. Therefore, because of the stabilizing effect of the battery, the voltage delivered by the generator is maintained substantially constant during operation at varying loads.

The apparatus, as thus far described, may be used to furnish both gas for heating purposes and electricity for lighting and power; or it may be used as a power system alone. The various types of house lighting-power plants on the market have been generally designed to operate upon gasoline, kerosene, or some analogous fuel; but they will operate just as satisfactorily upon producer gas, certain minor adjustments with respect to valve opening, etc., being, however, generally necessary. However, in Fig. 6 the apparatus is shown as designed primarily for the production of electricity for lighting and power purposes, entirely aside from the use of the producer to supply gas for cooking, heating, and the like.

And in the form of apparatus shown in Fig. 6, that part of the apparatus which is needed for effecting the supply of gas for purposes other than the operating of the engine-generator is not shown. Where the apparatus is to supply only electricity the pump 19 is not needed as the engine during operation will furnish the suction for blasting the fuel bed to cause the generation of such gas as is needed. But preferably a starting blower 70 is provided, for use during the blowing up or starting period. This blower is preferably of the motor operated centrifugal type, the motor being connected to the storage battery. Mounted in the inlet of the blower housing is a three-way valve, preferably of the turn plug type, designated generally by the numeral 71. Mounted on the casing of this valve are two contacts 72 in the circuit of the starting motor. Carried by the valve operating handle 73 is a contact member 74. One outlet of the valve casing is connected to the inlet of the blower housing, the outlet of the blower housing being connected to the vent pipe 27'. The other outlet of the valve casing is connected to the purifier inlet 75. The arrangement is such that moving the valve handle in one direction moves the valve to connect the interior of the producer to the starting blower and at the same time moves the contact member 74 to close the starting blower motor circuit to thus cause blasting of the fuel bed of the producer, the products of combustion escaping through the vent pipe; while moving the valve handle in the opposite direction moves the valve to connect the producer to the inlet of the purifier, and so to the engine, at the same time moving the contact member 74 to open the starting blower motor circuit.

While the engine is shown as connected to operate upon producer gas it is obvious that where the use of gas for heating purposes is not desired the engine will operate upon any suitable fuel. And regardless of the form of fuel used the controller described herein is applicable,—this form of controller being generally applicable in connection with any form of lighting or power plant.

Where the apparatus is arranged to supply gas for heating and cooking purposes, as well as electricity, the motor 20, which operates the pump 19 should be of variable speed, so that the blasting of the producer may be controlled to generate gas in accordance with load demands. Apparatus for thus controlling the operation of the pump is shown somewhat diagrammatically in Fig. 1 of the drawing. This apparatus comprises a rheostat, designated by the numeral 80, which is operated by means of a pressure responsive device, subject to the pressure in the delivery pipe 28. The pressure responsive device may be of any desired character, and it is shown, diagrammatically, as a gasometer, the lower bell 81 of which receives the two co-operating ends of the delivery pipe 28 therein, the upper bell 82 being movable and having a projection 83 thereon which is operably connected to the rheostat to vary the resistance in the circuit of the motor 20, in accordance with variations in pressure in the gas delivery lines, to vary the speed of that motor so as to maintain substantially constant the pressure within the delivery line.

In the arrangement shown in Fig. 1 gas is generated continuously, twenty-four hours a day, and the battery is therefore on charge continuously, but since the rate of charge of the battery is very low, no damage will be done to the battery even though it should reach a state of complete charge and be subjected to continued charging. For at the low rate of charge no damage would result.

The battery, of course, has a low internal resistance. In addition, the series winding of the controller as described has a low internal resistance. Consequently a slight voltage increase at the generator, above the counter E. M. F. of the battery, will cause a large current flow through the control apparatus. This gives very accurate control due to the resulting large power changes.

Furthermore, it is not necessary that the storage battery be used at all for helping to carry the load. And, if desired, it may be made quite small and used only for control purposes.

As described the apparatus definitely controls the blasting of the producer so that the fuel bed is maintained in good gas making condition. If, for example, the condition of the fuel bed varies so that for a given blast the quality of the generated gas decreases materially the engine can not carry its load and consequently the governor will be affected to vary the throttle opening to permit more gas to enter the engine cylinder. This in turn reacts, through the pressure contact, on the pump so that the producer is blasted at a greater rate and this brings the fuel bed back to the desired condition.

Also this arrangement makes for most efficient operation of the apparatus. The efficiency of an engine generator is normally low at such small loads as correspond to minimum driving rate of the producer. But when the gas is burned in the engine cylinder the water of the hot water system is heated about the same as if the same quantity of gas were burned to heat the water direct. Consequently the electricity generated at this time is in the nature of a by-product and costs nothing above the normal cost of maintaining the fuel bed of the producer in good gas making condition.

From the above description it will be apparent that the present invention provides a power unit in which the gas producer is operated most advantageously under all conditions of load, and that the power plant unit as a whole is operated most advantageously for the reason that the gas coming off from the gas producer when it is operating at minimum load is completely utilized and converted into electrical energy which is subsequently available to supplement the generator when the latter is operating at full capacity, thereby giving the power plant unit an electrical output, for a time at least, in excess of the output of the generator alone. The present invention has marked advantages over similar power plants in which the engine is operated intermittently at full load to charge a storage battery, for the reason that, in addition to the superior operation of the gas producer itself, a great saving in cost may be effected by the use of a storage battery of relatively small capacity as compared with the large capacity batteries required when the battery is relied upon for ordinary electrical loads and the engine is not operated except for large loads or to charge the battery, in which case the latter must have sufficient capacity to withstand relatively large charging currents.

Throughout the specification and claims the terms stator and rotor have been applied to the stationary and the movable parts, respectively, of the governor, but it should be understood that these terms are used merely for convenience in description and are not intended as limiting in any sense, but should be regarded as applicable equally to any equivalent fixed and movable parts, respectively.

While the method herein described, and the form of apparatus for carrying this method into effect, constitutes a preferred embodiment of the invention, it is to be understood that the invention is not limited to this precise method and form of apparatus, and that changes may be made in either without departing from the scope of the invention which is defined in the appended claims.

What is claimed is:

1. A power plant of the character described comprising, in combination, a gas producer, an engine connected to the gas producer and adapted to produce the air-suction for the operation of the same, a storage battery, a dynamo-electric machine connected to the engine and adapted to be driven thereby, said engine being normally operable at a fraction of its maximum load, to provide the minimum air-suction to maintain the gas producer in continuous operation, a distributing circuit connected to the dynamo-electric machine, and control means for varying the engine operation to meet a varying demand in the distribution circuit and to charge the battery at a predetermined rate.

2. A power plant of the character described comprising, in combination, a gas producer, an engine connected to the gas producer, a storage battery, a dynamo-electric machine connected to the engine and blasting means for the producer normally operable to provide the minimum air-suction to maintain the gas producer in continuous operation, a distributing circuit connected to the dynamo-electric machine, and control means operating concomitantly with varying demand in the distribution circuit to control the engine output whereby the dynamo will charge the battery at substantially all engine loads up to the maximum load of the dynamo electric machine.

3. A power plant of the character described comprising, in combination a gas producer, an internal combustion engine connected to the gas producer, a storage battery, a dynamo-electric machine connected to the engine and adapted to be driven thereby, said engine being normally operable at a fraction of its maximum speed, blasting means operable by said engine and adapted to provide the minimum air-suction to maintain the gas producer in continuous operation when said engine is operated at said fraction of its maximum speed to charge the battery at a predetermined rate, a distributing circuit connected to the dynamo-electric machine, and means responsive to current discharge from the battery to vary the engine operation to cause it to carry varying loads.

4. A power plant of the character described comprising, in combination a gas producer, an engine connected to the gas producer, a storage battery, a dynamo-electric machine connected to the engine and adapted to be driven thereby, said engine being normally operable at a fraction of its maximum speed, blasting means operable to provide the minimum air-suction to maintain the gas producer in continuous operation, a distributing circuit connected to the dynamo-electric machine, said dynamo-electric machine being connected between the battery and the distribution circuit, and control means comprising an element in series with the dynamo-electric machine and the battery for varying the engine operation to meet a varying demand in the distribution circuit to vary the dynamo output whereby to cause the latter to continue charging the battery within the capacity of the dynamo electric machine at substantially the said predetermined rate.

5. In a power plant of the character described comprising a gas producer, an engine operated therefrom, an electric generator driven by the engine, and a storage battery and a distribution circuit connected with the generator; the method of operation which consists in normally operating the engine at a fraction of its maximum capacity to carry the minimum distribution load and to charge the battery at a predetermined rate, and varying the engine operation in accordance with increased load, to increase the dynamo output to meet increased demands in the distribution circuit and to also continue the charging of the battery at a predetermined rate.

6. In a power plant of the character described comprising a gas producer, an engine operated therefrom, an electric generator driven by the engine, and a storage battery and a distribution circuit connected with the generator; the method of continuous operation which consists in normally running the engine at a fraction of its maximum capacity to cause blasting of the producer at its minimum driving rate and to cause such dynamo output as will carry the minimum distribution load and charge the storage battery at a predetermined rate, varying the engine operation to carry an increased load by controlling the fuel input to the engine in accordance with the flow of current from the dynamo to the storage battery to vary the output of the dynamo to meet the demand in the distribution circuit, and to charge the storage battery at a predetermined rate so long as the demand in the distribution circuit is within the capacity of the engine-generator, and varying the rate of blasting of the producer in accordance with the increased demand for gas.

7. A gas-power plant of the character described comprising a gas producer, means for blasting said producer to cause the generation of gas and for feeding said gas to a delivery main, a gas engine connected to said delivery main, an electric generator driven by said engine, a distribution circuit connected to said generator including a motor for operating the blasting and gas feeding means, a storage battery connected to said generator, and means for controlling the operation of the gas engine to cause the generator to carry the distribution load and charge the storage battery at a predetermined rate.

8. A gas-power plant of the character described comprising a gas producer, means for blasting said producer to cause the generation of gas and for feeding said gas to a delivery main, a gas engine connected to said delivery main, an electric generator driven by said engine, a distribution circuit connected to said generator including a motor for operating the blasting and gas feeding means, a storage battery connected to said generator, and means for controlling the operation of the gas engine to cause the generator to carry the distribution load and charge the storage battery at a predetermined rate, and means for varying the operation of the blasting and gas feeding means in accordance with the demand for gas.

9. A domestic gas-power plant of the character described, adapted to provide gas for heating, cooking, and the like, and for operating an electric generator to supply electric current for lighting and power purposes, comprising a gas producer, means for blasting said producer to cause the generation of gas and for feeding said gas to a delivery main; a heating device such as a stove, connected to said delivery main and adapted to operate upon the generated gas; a gas engine connected to the delivery main and adapted to operate upon the generated gas, an electric generator driven by said engine, a distribution circuit connected to said generator including a motor for operating the blasting and gas feeding means, a storage battery connected to said generator, and means for controlling the operation of the gas engine to cause the generator to carry the distribution load and to charge the storage battery at a predetermined rate.

10. A domestic gas-power plant of the character described adapted to supply gas for heating, cooking, and the like, and to supply electric current for lighting and power purposes, comprising a gas producer, means for blasting said producer to cause the generation of gas and for feeding said gas to a delivery main; a heating device such as a stove connected to said delivery main; a gas engine connected to said delivery main, an electric generator driven by said engine, a distribution circuit connected to said generator including a motor for operating the blasting and gas feeding means, a storage battery connected to said generator, means for controlling the operation of the gas engine to cause the generator to carry the distribution load and charge the storage battery at a predetermined rate, and means for varying the operation of the blasting and gas feeding means in accordance with the demand for gas.

11. A gas-power plant of the character described comprising a gas producer, means for blasting said producer to produce a combustible gas and for feeding said gas to a delivery main, means operating upon the generated gas for driving said blasting and gas feeding means, said means being of such operative characteristics as to operate upon the gas generated at minimum driving rate of the producer, an electric generator driven by said operating means, and means controlled by said electric generator for effecting control of the said operating means.

12. A gas-power plant of the character described comprising a gas producer adapted to contain a fuel bed; means for blasting the fuel bed to produce a combustible gas, including an engine, an electric generator driven by said engine, a distribution circuit connected to said generator, and control means operated by said generator operative during periods of zero external load upon said distribution circuit for causing said blasting means to normally blast the producer at least at its minimum driving rate.

13. A gas power plant of the character described comprising a gas producer adapted to contain a fuel bed; means for blasting the fuel bed to produce a combustible gas including an engine adapted to be operated by the generated gas; an electric generator driven by said engine, a distribution circuit connected to said generator, and control means in said distribution circuit for automatically varying the operating rate of said engine to thereby control the blasting rate of said producer.

14. A gas power plant as set forth in claim 13, in which the control means is responsive to external load conditions in said distribution circuit to automatically cause variation of the driving rate of said engine to carry said load up to the maximum load thereof, and in which said control means is operative under conditions of zero external load to maintain operation of said engine at a rate which causes blasting of the producer at least at its minimum driving rate.

In testimony whereof I hereunto affix my signature.

HARRY F. SMITH.